United States Patent [19]
Creason et al.

[11] Patent Number: 5,503,859
[45] Date of Patent: Apr. 2, 1996

[54] PRECISION FRUIT PROCESSING AND PREMIUM PACKING SYSTEM

[75] Inventors: Kenneth C. Creason, Fillmore; John A. Salka, Santa Paula, both of Calif.

[73] Assignee: Fillmore-Piru Citrus Association, Fillmore, Calif.

[21] Appl. No.: 137,612

[22] Filed: Oct. 14, 1993

[51] Int. Cl.⁶ ............... A23B 7/00; A23B 7/14; A23B 7/153; A23B 7/16
[52] U.S. Cl. ............ 426/308; 426/333; 426/335; 426/532; 426/616
[58] Field of Search .................. 426/308, 323, 426/333, 335, 532, 616

[56] References Cited

U.S. PATENT DOCUMENTS

| | | | |
|---|---|---|---|
| 3,924,381 | 4/1975 | Sardo | 53/3 |
| 4,764,385 | 8/1988 | Butland | 426/241 |
| 4,842,880 | 6/1989 | Creason et al. | 426/303 |
| 5,312,034 | 5/1994 | Nakagawa et al. | 229/120 |

OTHER PUBLICATIONS

Abstract, Singh et al., Indian Journal of Ag. Sci, 1979, 49(11) pp. 862–866.
Abstract, Davenel et al., Journal of Ag. Eng. Res. vol. 41, (1) Apr. 1988 pp. 1–9.
A. Davenel et al., Automatic Detection of Surface Defects on Fruit by Using a Vision System, J. Agric. Engig Res. 41, 1–9, 1988.
Singh, J. P., et al., Control of Post Harvest Decay..., Indian Journal of Ag. Sci., 49(11), pp. 862–866, Nov. 1979.

*Primary Examiner*—Donald E. Czaja
*Assistant Examiner*—Curtis E. Sherrer
*Attorney, Agent, or Firm*—Gene W. Arant

[57] ABSTRACT

A method of processing fruit, such as oranges, in which different chemical treatments are applied to different output streams of fresh fruit by passing the fruit in a continuous flow to an electronic grading apparatus having a single input but a plurality of separate and parallel outputs, and applying different chemical treatments to the continuous streams of fruit received from the different parallel outputs. This method permits a complete flexibility for optimizing treatment of various different grades of fruit that are intended to be sold as fresh fruit, or for different batches of the same grade that are intended for different markets. A particular advantage is that fruit intended for use in byproducts may be processed without any chemical treatment at all.

13 Claims, 4 Drawing Sheets

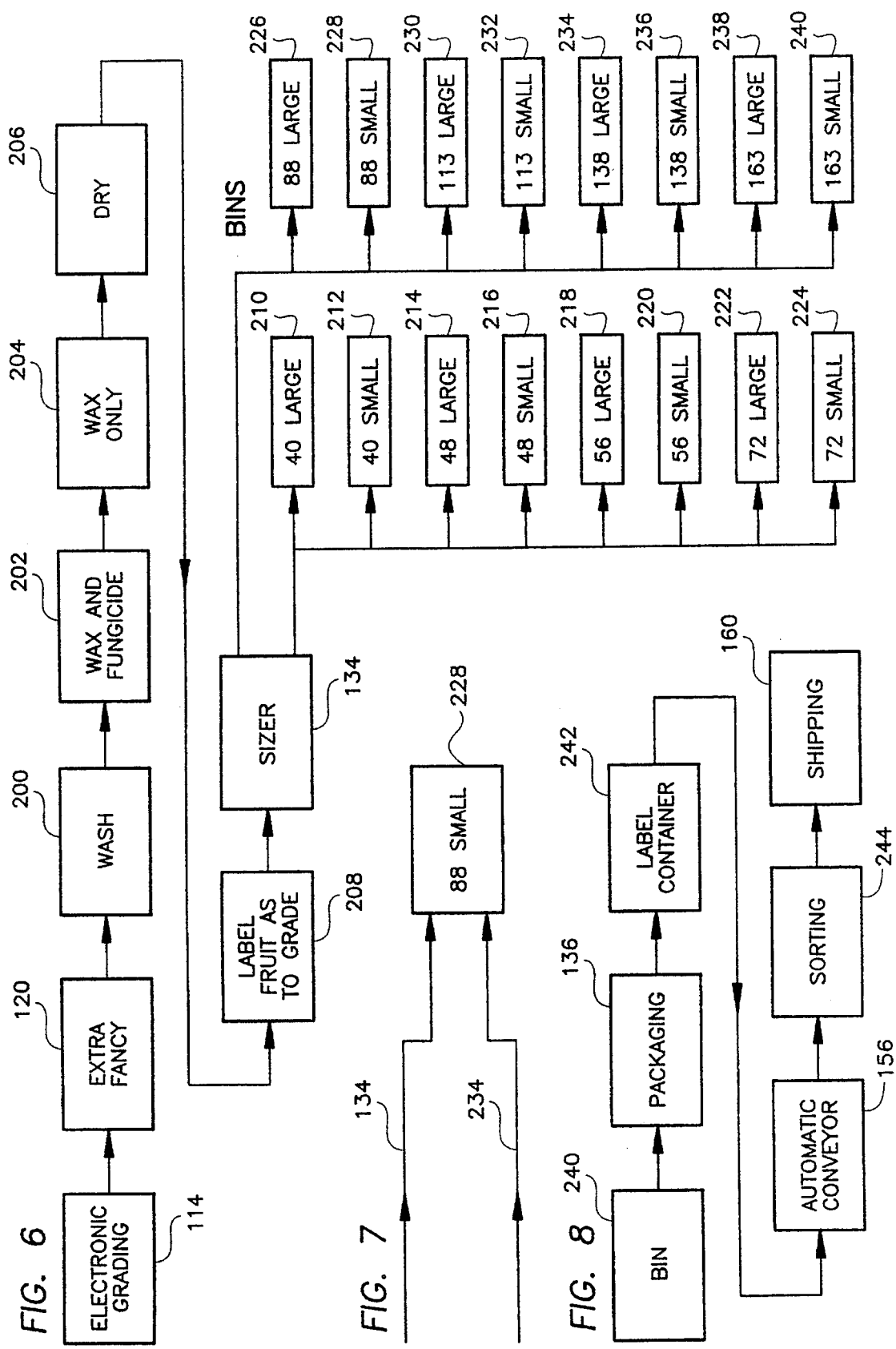

1

PRECISION FRUIT PROCESSING AND PREMIUM PACKING SYSTEM

BACKGROUND OF THE INVENTION

The present invention relates to fruit packing house operations; i.e., the processing of fresh fruit in order to prepare it for market.

PRIOR ART

In the fruit packing industry it is a general practice to start the processing of fresh fruit by separating out and disposing of the fruit that is either rotten or is so damaged that it will spoil before reaching the market; then washing the fruit; and then applying whatever chemical treatment is desired to protect the fruit. Thereafter a series of grading, sizing, and packing operations take place, the specific details of which depend upon the kind of fruit being processed, how it is to be marketed, and other factors. Most fruit packing operations also separate out portions of the fresh fruit that cannot economically be packed and sold as fresh fruit per se; these portions of the fruit crop are then made into byproducts such as juice, jam, or other derivative products.

The grading of fruit was traditionally done by workers on the basis of visual inspection. It has been known for some time, however, that automatic machines may be utilized for grading fruit according to shape, color, and surface blemishes, as the fruit is moved longitudinally along a conveyor at high speed. The process was first suggested in 1947 in a Master's Degree thesis by Alfred Thym at the University of California at Davis.

The automatic grading equipment typically involves one or more light sources, detection means for detecting light reflected from the surface of the fruit, and electronic circuitry for evaluating the information received by the detection means. Some specific examples of such grading machines are shown in U.S. Pat. No. 4,308,959 issued in 1982; in U.S. Pat. No. 4,534,470 issued in 1985; in U.S. Pat. No. 5,164,795 issued in 1992; and others. In conjunction with that type of equipment an ejection station is provided with multiple outputs at which the fruit of different grades are ejected from the conveyor.

It has been the conventional practice to apply chemical treatment to the fruit before grading it, whether the grading has been accomplished as a hand operation or by passing it through automatic grading equipment. Thus, all the fruit is first washed and given a uniform chemical treatment, and the grading operation is performed subsequently.

SUMMARY OF THE INVENTION

According to the present invention the application of chemical treatment to the fruit is deferred until after the fruit has been graded, and each separate grade is then individually either chemically treated —or not treated —to provide for its best usage and to satisfy any special customer requirements that may arise. At the grading machine a single input stream of fruit is divided into at least two continuous and separate output streams, one of which is normally assigned for byproduct usage. The fruit that has been graded for byproduct usage is preferably not given any chemical treatment at all, so that the juice, jam, or other derivative products are protected from containing any traces of chemical residue. Thus, whereas the prior art devoted complete attention to protection of the fruit itself against spoilage, the present invention in addition to accomplishing that result also provides for both consumer protection and maximum consumer satisfaction.

In accordance with the invention two or more of the output streams of fruit from the grading machine may be intended for sale as fresh fruit. If so, they may concurrently be given chemical treatments selected to differ significantly from each other so as to optimize the utilization or marketability of the respectively different grades of the fruit or to meet different market demands.

Further in accordance with the invention, the precision of electronic grading of fresh fruit is improved by dividing a stream of fresh fruit between two electronic grading machines substantially in accordance with size, then further sizing each grade of fruit derived from each grading machine, and thereafter combining the graded and sized outputs of both grading machines in a single set of storage facilities. Thus, each grading machine operates with fruit that is within a limited size range, thereby improving its precision.

DRAWING SUMMARY

FIGS. 6, 7, and 8 are schematic block diagrams showing further details of the preferred form of the process in accordance with the present invention.

Figure 1:
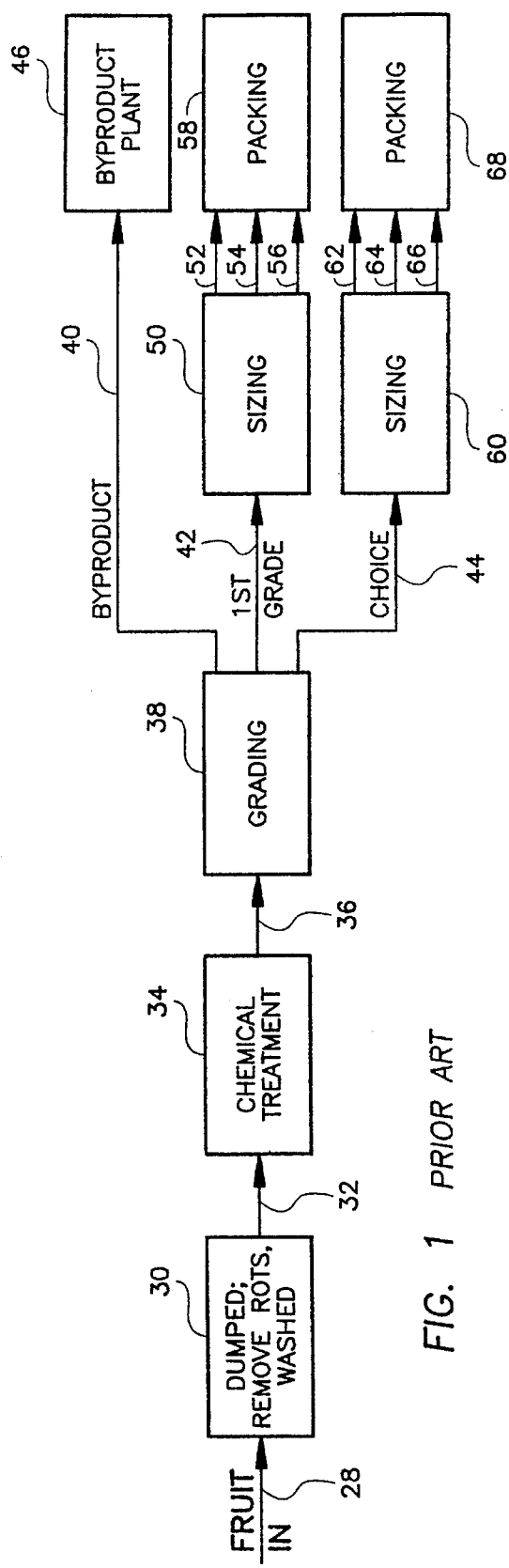
FIG. 1 is a schematic block diagram showing the typical process according to the prior art.
Figure 3:
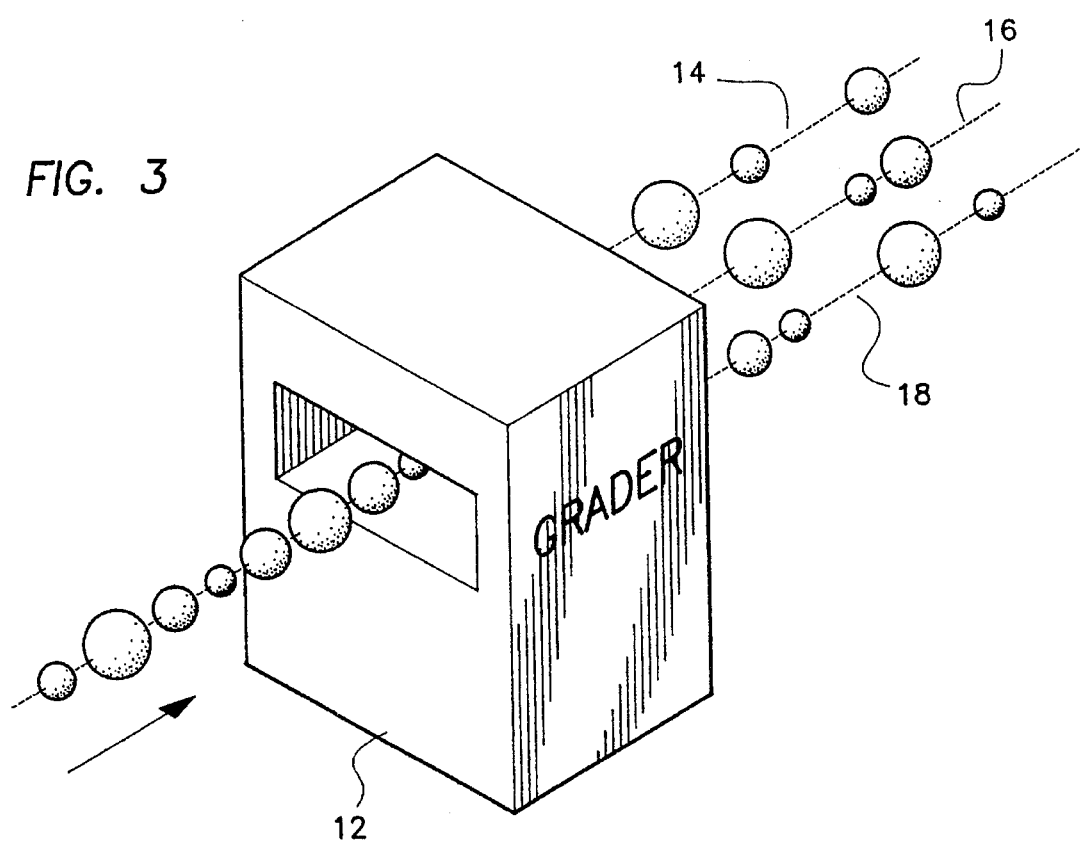
FIG. 3 illustrates graphically how an optical and electronic grading machine may separate an incoming stream of fruit into several outgoing streams according to grade, although each outgoing stream still includes fruit of different sizes.
Figure 4:
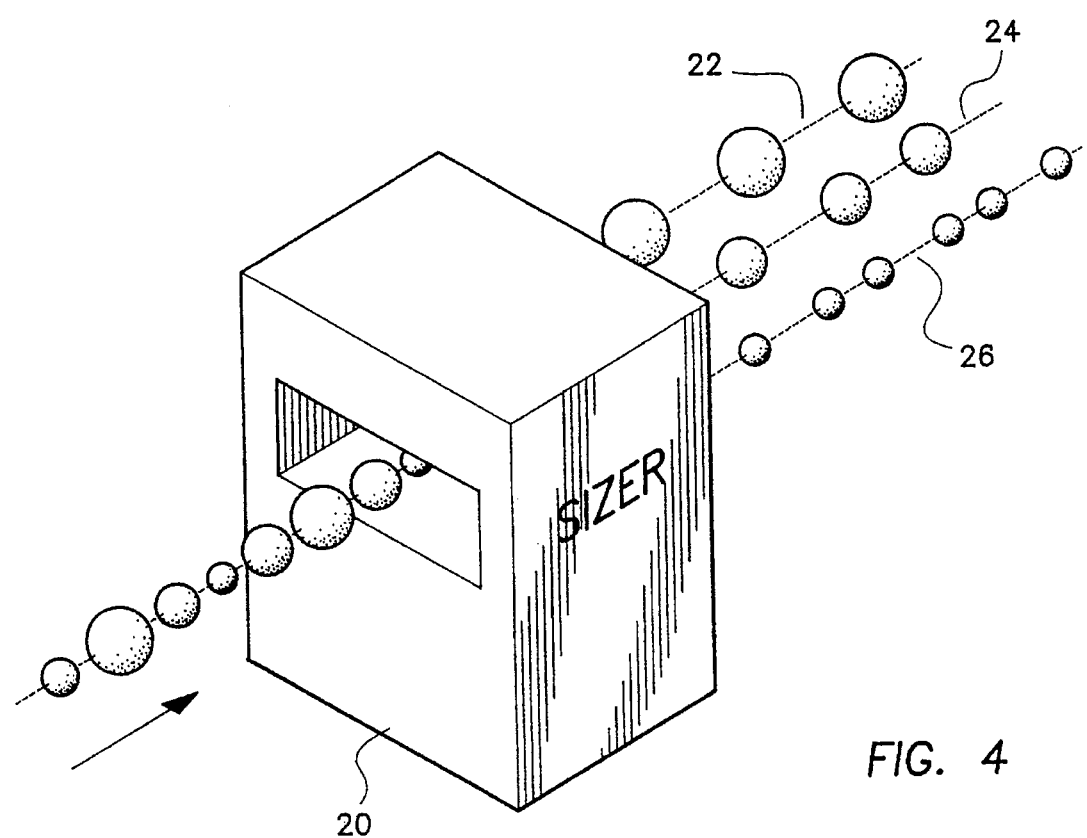
FIG. 4 illustrates graphically how a sizing machine may separate an incoming stream of fruit into several outgoing streams according to size, whether or not the incoming stream includes fruit of different grades.

DESCRIPTION OF THE PRIOR ART (FIGS. 1, 3, and 4)

As shown schematically and graphically in FIG. 3, if a single input flow containing fruit of different grades and sizes is supplied to an optical and electronic grading machine 12, multiple output streams 14, 16, and 18 of fruit will then be produced containing fruit that is separated according to grade but may still include different sizes.

FIG. 4 shows how the application to a sizing machine 20 of a single input flow of fruit containing fruit of different grades and sizes then produces output streams 22, 24, and 26, in each of which the fruit are within a predetermined size range, but are not separated according to grade.

FIG. 1 shows in block diagram form the typical process of the prior art. As shown at 28 the fruit is typically transported from the grove or field in containers from which it is then dumped. As shown at block 30 it is then sorted, usually by hand, to remove rotten fruit and any that is so damaged that it will spoil before reaching the market; and the fruit is also washed. Although not specifically shown in FIG. 1, in the prior art it is known to pass the fruit immediately after the first washing through a pre-sizing machine to separate out undersize fruit which will then be sent to a byproducts plant 46. The remaining fruit then continues in a single stream 32 to the application of chemical treatment as indicated by a block 34. After the chemical treatment, although not specifically shown here, the fruit may be passed through a dryer for drying it. A single output stream of fruit 36, bearing the chemical treatment such as wax and/or fungicide, is now applied to a grading process as is indicated by the block 38. The result of the grading process is several continuous output streams of fruit 40, 42, and 44 separated according to grade, all of which have had the same chemical treatment although each output stream contains fruit of different sizes.

Output stream 40 marked "byproduct" includes fruit that is of such irregular shape or so blemished that it cannot be packed and sold as fresh fruit per se. The fruit in stream 40 is then directed to the byproducts plant 46 where, along with any previously separated undersize fruit, it is made into a derivative product. It should be noted that the fruit in stream 40 has received the same chemical treatment as the other output streams 42 and 44.

Fruit in stream 42 marked "first grade" has been found to meet a high level of requirements as to shape, color, and/or blemishes. It goes to a sizing process as shown at 50, resulting in separate output streams 52, 54, 56. It will be understood that each of the output streams 52, 54, and 56 contains first grade fruit that has received the same chemical treatment and that the sole difference among these outputs is the size of the fruit. All of these outputs are then separately packed, as indicated generally at block 58.

Fruit in stream 44 marked "choice" has been found to meet a lesser level of requirements as to shape, color, and/or blemishes. It goes to a sizing process as shown at 60, resulting in separate output streams 62, 64, 66. It will be understood that each of the output streams 62, 64, and 66 contains choice grade fruit that has received the same chemical treatment and that the sole difference among these outputs is the size of the fruit. Each of these outputs is then separately packed, as indicated generally at block 68.

DESCRIPTION OF THE INVENTION (FIGS. 2 and 5–8)

DIFFERENT CHEMICAL TREATMENTS OF DIFFERENT GRADES

Figure 2:
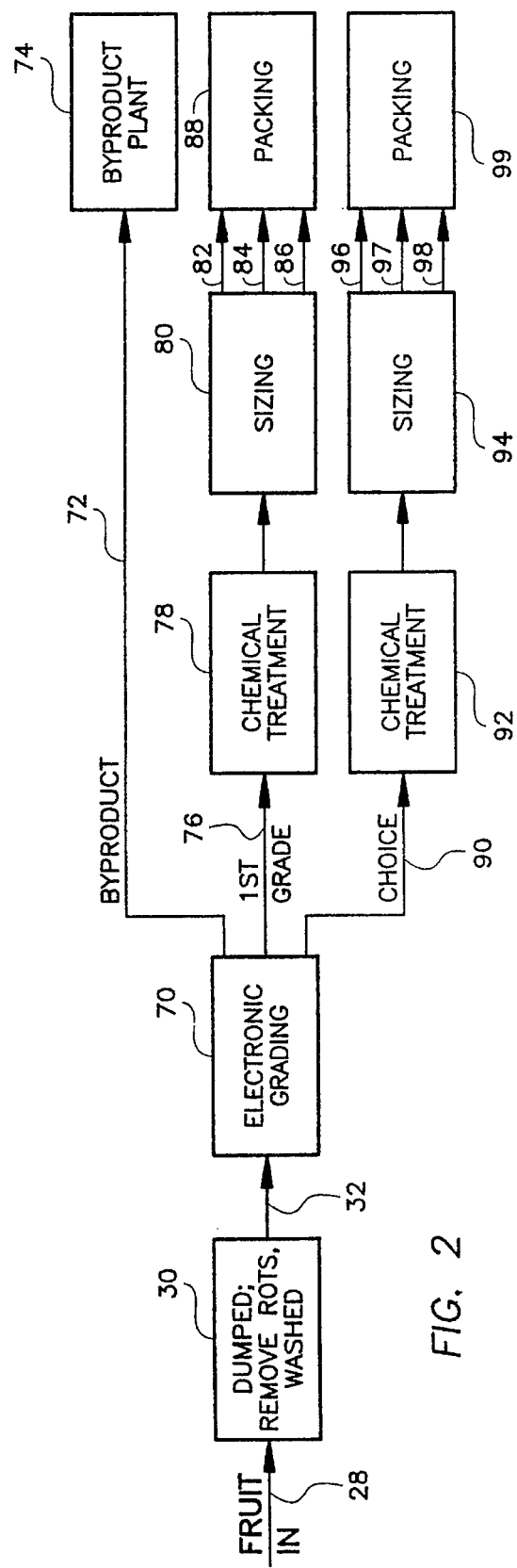
FIG. 2 is a schematic block diagram showing the fundamentally different process in accordance with the present invention.

Reference is now made to FIG. 2 illustrating the general form of the invention. Steps 28, 30, and 32 are the same as in FIG. 1. The fruit stream 32, however, is applied without any previous chemical treatment directly to an optical and electronic grading machine 70. An output stream 72 from the electronic grading machine 70 is marked "byproduct" and includes fruit that goes directly to the by-products plant 74 without any chemical treatment whatsoever.

In the processing of fresh fruit the chemical treatment usually involves a combination of wax and fungicide, with the function of the wax being to physically protect the skin of the fruit while the function of the fungicide is to protect it against rotting or decay. The wax may typically be a natural material such as carnauba, which is generally harmless if consumed by humans. Even small quantities of fungicidal materials, however, can have adverse effects upon humans.

Thus according to the present invention the application of chemical treatment to the fruit is deferred until after the fruit has been graded, and each separate grade is then either chemically treated —or not treated —to provide for its best usage. That portion of the fruit which has been graded for byproduct usage in juice, jam, or other derivative product is preferably not given any chemical treatment at all, so that the derivative products are completely protected from containing any chemical residue whatsoever.

Output stream 76 of first grade fruit is sent through its own separate chemical treatment process 78, and thence to a sizing machine 80. The first grade outputs of different sizes 82, 84, and 86 are then separately packed, as generally indicated at box 88. Output stream 90 of choice grade fruit is sent through its own separate chemical treatment process 92, and thence to a sizing machine 94. The choice grade outputs of different sizes 96, 97, and 98 are then separately packed, as generally indicated at box 99.

Although not specifically shown in FIG. 2, it may be preferred to apply different chemical treatments to the different grades of product. Thus, first grade fruit may be given one type of chemical treatment while choice grade may be given an entirely different type of treatment. For example, fruit that is to be distributed for immediate consumption may be processed with an application of wax but without fungicide. Other fruit may need the application of an ordinary amount of fungicide, and fruit that is to be shipped great distances may require a greater amount or different type of fungicide.

It will be understood that the process as shown in FIG. 2 involves a deliberate duplication of the chemical treatment equipment, but economizes on the use of the chemical materials in that none is applied to the byproducts output 72. Furthermore, in accordance with the invention all byproduct fruit is preferably delivered to the byproduct plant without any prior chemical treatment whatever, while the fruit that is intended for sale as fresh fruit is not only protected against spoilage, but is also prepared in such a way as to provide for both consumer protection and maximum consumer satisfaction.

PREFERRED EMBODIMENT

FIGS. 5–8

Figure 5:
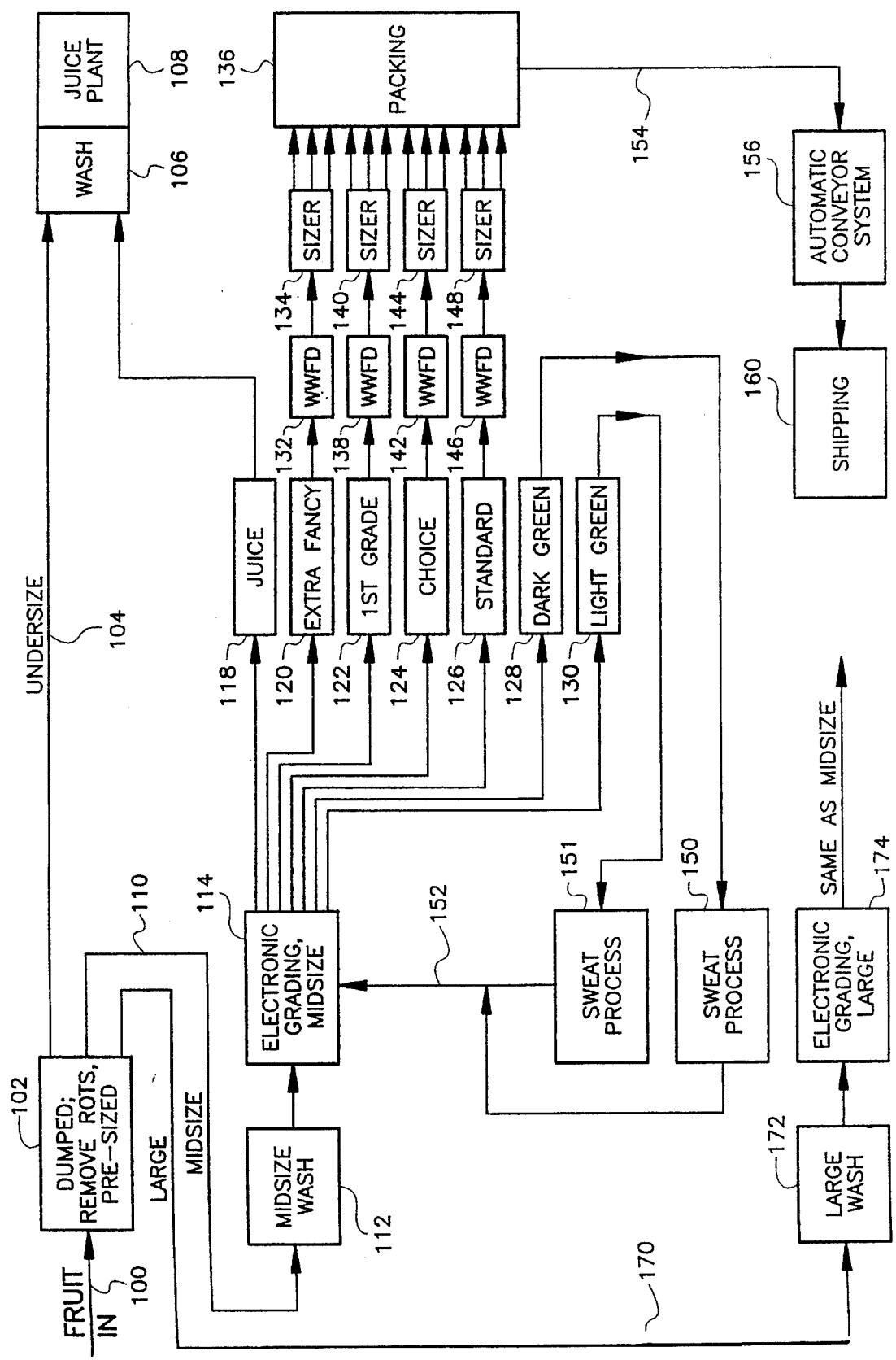
FIG. 5 is a schematic block diagram showing the presently preferred process in accordance with the invention as applied to fresh citrus fruit.

Reference is now made to FIG. 5 which illustrates in schematic block diagram form the presently preferred form of the novel method of the present invention, as specifically applied to the processing of citrus fruit such as oranges.

In FIG. 5 the arrow 100 indicates incoming fruit. As shown at 102 the fruit is dumped, rots are removed, and it is also pre-sized. One of the outputs of the pre-sizing machine is undersize fruit 104, which without any chemical treatment is directly assigned to by-products and is sent to a juice plant 108 where it is first washed as indicated at 106. Even if the juice plant is a considerable distance away from the packing plant the undersize fruit 104 may be transported there in its unwashed and unwaxed state. As previously stated, it is undesirable for reasons of consumer and environmental protection to apply any chemical treatment to the undersize fruit 104 before assigning it to the juice plant 108.

Other outputs of the pre-sizing machine 102 are midsize fruit indicated by arrow 110 and large fruit indicated by arrow 170. The operation of the pre-sizing machine is adjustable, and it is desirably adjusted so that approximately half of the stream of fruit is supplied to midsize grader 114 and approximately half to the large size grader 174. This adjustment is made so as to maintain a full flow of fruit through the processing equipment. As later described, the final midsize and large outputs are combined, so the initial separation as shown in FIG. 5 is made simply for the greater convenience and efficiency of the process.

The midsize fruit 110 is passed through its own separate washing station 112 and is applied without any previous chemical treatment directly to an electronic grading machine 114 having multiple outputs. The result is separate output streams 118, 120, 122, 124, 126, 128, and 130. These output streams of fruit may be regraded or inspected in a hand operation if so desired. Output 118 is identified as juice oranges, which are not undersize but fall within the midsize range. In general, juice oranges are blemished and have "condition defects" that would cause spoilage. The midsize juice oranges 118 are typically sold in bulk along with the undersize oranges 104 to the juice plant 108 where they are first washed as indicated at 106.

Output 120 is identified as "extra fancy" and includes fruit that is superior in size, shape, color, and uniformity of appearance. The extra fancy oranges are supplied to their own separate chemical treatment station 132 identified as "WWFD" for an optional second washing followed by waxing, the application of a fungicidal material, and drying.

From the treatment station 132 the extra fancy oranges pass to a sizer 134 where the single stream of fruit is divided into multiple streams according to size. Then each stream is separately packed as indicated generally at 136.

Output stream 122 of first grade fruit is sent through its own separate chemical treatment process 138, and thence to a sizing machine 140. The first grade outputs of different sizes are then separately packed, as generally indicated at box 136.

Output stream 124 of choice grade fruit is sent through its own separate chemical treatment process 142, and thence to a sizing machine 144. The choice grade outputs of different sizes are then separately packed, as generally indicated at box 136.

Output stream 126 of standard grade fruit is sent through its own separate chemical treatment process 146, and thence to a sizing machine 148. The standard grade outputs of different sizes are then separately packed, as generally indicated at box 136.

The optical and electronic grading machine used at station 114 is also capable of separating out oranges that are lacking in the desired orange or yellow color, and dividing them into "dark greens" and "light greens". The dark green stream designated as 128 is fed back to a sweat chamber 150, where the oranges are kept at a controlled temperature for up to 96 hours in order to advance their greening process. The light green stream designated as 130 is fed back to the sweat chamber 151, and those oranges are degreened at a temperature of 68 to 70 degrees F. for a shorter period of time up to 48 hours. Oranges that have thus completed their necessary processing in a sweat chamber are then, as indicated by arrow 152, fed back to the input of the electronic grading machine 114. When run through the grading machine for the second time they will not again need to be separated out as lacking in orange color, but will instead become part of one of the output streams 118, 120, 122, 124, 126.

Various types of packing procedures are used in the citrus industry, but the output of the packing process 136 is preferably a series of containers indicated by arrow 154 that are fed to an automatic conveyor system 156 which identifies, sorts, and then distributes them in an appropriate manner to a shipping department 160.

The large size fruit stream 170 is routed through its own separate washing process 172 and then to its own separate electronic grading machine 174. The various outputs of the grading machine 174 pass through a separate set of machines and equipment, duplicating the process applied to midsize fruit 110. The final outputs of the large size fruit are preferably combined with the midsize outputs either at the inputs of the sizers 134, 140, 144, 148, or else in a single set of storage bins that receive both the midsize and large outputs.

Although FIG. 5 shows only a single midsize grader 114 and a single large grader 174, it may in fact be preferred to employ a selected number of midsize graders operating in parallel as well as a selected number of large size graders operating in parallel.

Although not specifically shown in FIG. 5, it may be preferred to apply different chemical treatments to the different grades of product. Thus, first grade fruit may be given one type of chemical treatment while choice grade may be given an entirely different type of treatment. For example, fruit that is to be distributed for immediate consumption may be processed with an application of wax but without fungicide. Other fruit may need the application of an ordinary amount of fungicide, and fruit that is to be shipped great distances may require a greater amount or different type of fungicide.

It will be understood that the process as shown in FIG. 5 involves a deliberate duplication of the chemical treatment equipment, but economizes on the use of the chemical materials in that none is applied to the byproducts outputs 104 and 118. Furthermore, in accordance with the invention all byproduct fruit is preferably delivered to the byproduct plant without any prior chemical treatment whatever.

Reference is now made to FIGS. 6 through 8 which illustrate the process of FIG. 5 in more detail, using as an example only the extra fancy grade of fruit provided by the grading machine 114. As shown in FIG. 6, the stream 120 of extra fancy fruit passes through a separate wash 200 and then a wax and fungicide process 202. As taught in our U.S. Pat. No. 4,8742,880 issued in 1990 and U.S. Pat. No. 5,101,763 issued Apr.7, 1992, there is an advantage in applying wax in a two-step process. The method taught in those patents is particularly adapted for the chemical treatment of citrus fruit such as oranges. According to that method the fruit is first coated with a combination of wax and fungicidal material, and thereafter a separate coating of wax alone is applied. The effectiveness of the fungicide is thus optimized by concentrating it next to the skin of the fruit, and the effectiveness of the wax is also optimized by placing an undiluted layer of it on the outside surface where it provides a visible surface shine. Thus, after the wax and fungicide process 202 there is an application of wax alone as indicated at 204. Then the fruit is dried as indicated at 206. Thus the single step WWFD indicated at 132 in FIG. 5 is preferably carried out as the sequence of separate steps 200 through 206.

The next step shown at 208 is to label each individual fruit as extra fancy grade, by stamping or by applying an appropriate sticker type label. Then the stream 120 of extra fancy fruit, as thus chemically treated and labelled, is supplied to sizer 134. The sizer may if desired be operated to separate the fruit in accordance with separate and distinct sizes for domestic and export markets, each of which is then placed in a separate bin for packing.

As shown in FIG. 6, a set of sixteen storage bins 210, 212, ... 238, 240 is provided. The largest fruit to be stored in the bins are of such size that 40 of them will fill a standard size container. Thus the designation "40" indicates the number that will fill a standard carton. The sizer 134 may preferably be set, however, to divide the size 40 fruit into relatively large, which are assigned to bin 210, and relatively small, which are assigned to bin 212. For the size 48 fruit the relatively large are assigned to bin 214 and the relatively small to bin 216. In like fashion each of the other sizes 56, 72, 88, 113, 138, and 163 is divided into large and small, with bin 238 receiving the large 163's while bin 240 receives the samll 163's.

In marketing the fruit there is an advantage in packing the relatively large fruit of each size for the export market and the relatively small fruit of each size for the domestic market. In accordance with the invention both are accomplished at the same time.

Although FIG. 6 illustrates the details of the process only for extra fancy grade fruit, it will be understood that the same process may be applied to each of the first grade, choice, and standard grades, each of which may if desired be then stored in its own separate set of sixteen storage bins.

There is in fact some overlap between the sizes of fruit that the presizer 102 selects as midsize or large. Therefore, the extra fancy fruit provided from the large grading machine 174 may be supplied to the same set of storage bins 210 240. This is indicated in FIG. 7, where an output from sizer 134 for the midsize extra fancy fruit and an output from sizer 234 for the large size fancy fruit are both applied to the single storage bin 228 for small size 88 fruit.

As shown in FIG. 8, the output from each storage bin such as bin 240 passes to the packaging station 136, and then through a labeling station 242 where each container is separately labeled to indicate both the grade and size of fruit that it contains. The stream of labeled cartons is then applied to automatic conveyor 156 which accomplishes sorting of the containers as indicated at 244, before they are ready for shipping as indicated at 160.

ALTERNATIVE FORM

Although it is preferred to defer all chemical treatment until after grading, if desired a partial or full application of fungicide may be included in the preliminary washing process.

Although a presently preferred embodiment of the invention has been illustrated and described in some detail in order to comply with the full disclosure requirements of the patent laws, it will nevertheless be understood that the invention is not limited to the specific details described, but on the contrary that its scope is to be determined only in accordance with the appended claims of invention.

What we claim is:

1. A method of processing fresh fruit to provide a plurality of separate quality grades each having a different chemical coating treatment, comprising the following steps:

selecting an electronic fruit grading apparatus having an input and a plurality of outputs, said apparatus being adapted to receive a continuous flow of fruit at its input and to divide the fruit into a corresponding plurality of output streams;

passing said fruit in a continuous flow into the input of the electronic fruit grading apparatus so as to provide one output stream corresponding to byproducts grade and a number of other output streams respectively corresponding to other and separate grades of fruit that are suitable to be packed and sold as fresh fruit;

selecting different chemical coating treatments to be applied to said separate grades of fruit that are to be packed and sold as fresh fruit; and then concurrently applying said different chemical coating treatments to respectively different ones of said other output streams of fruit, but without concurrently applying any chemical treatment to said one output stream that corresponds to byproducts grade.

2. The method of claim 1 wherein each of said other separate streams of chemically treated fruit is then passed through sizing apparatus so as to divide each said separate stream into further streams according to size.

3. The method of claim 1 that includes the further step of transporting said byproducts grade fruit to a byproducts facility without applying any chemical treatment thereto subsequent to its passage through said electronic fruit grading apparatus.

4. The method of claim 1 that includes a prior step of washing and pre-sizing the fruit to separate out undersized fruit; and wherein both said undersized fruit and said byproducts grade fruit are transported to a byproducts facility without application of any chemical treatment subsequent to said washing and pre-sizing step.

5. The method of claim 1 wherein said chemical treatment applied to each of said other separate streams of fruit suitable to be packed and sold as fresh fruit is applied in two separate steps, a first step providing a coating of both wax and fungicide and a second step providing a coating of wax alone.

6. A method of processing fresh fruit to provide a plurality of separate quality grades each with a different chemical coating treatment, comprising the following steps:

selecting an electronic fruit grading apparatus having an input and a number of outputs, said apparatus being adapted to receive a continuous flow of fruit at said input and to divide the fruit into a number of output streams;

selecting said fruit that is to be processed and passing said fruit in a continuous flow into said input of said electronic fruit grading apparatus so as to provide at the outputs of said apparatus a plurality of separate output streams corresponding to separate grades of said fruit that are suitable to be packed and sold as fresh fruit;

selecting different chemical coating treatments to be applied to said separate grades of fruit that are to be packed and sold as fresh fruit; and then concurrently applying said different chemical coating treatments to respectively different ones of said separate output streams of fruit.

7. The method of claim 6 wherein each of said separate streams of chemically treated fruit is then passed through sizing apparatus so as to divide each said separate stream into further streams according to size.

8. The method of claim 6 wherein said chemical treatment applied to each of said separate streams of fruit that is suitable to be packed and sold as fresh fruit is applied in two separate steps, a first step providing a coating of both wax and fungicide and a second step providing a coating of wax alone.

9. The method of claim 8 wherein each of said separate streams of chemically coated fruit is then passed through sizing apparatus so as to divide each said separate stream into further streams according to size.

10. A method of processing fresh fruit to provide a plurality of exiting streams for said fruit for packaging, each exiting stream having a separate chemical coating treatment, comprising the following steps:

selecting an electronic fruit grading apparatus having an input and a number of outputs, said apparatus being adapted to receive a continuous flow of fruit at said input and to divide the fruit into a number of continuous and separate output streams:

selecting said fruit that is to be processed and passing said fruit in a continuous flow into said input of said electronic fruit grading apparatus so as to provide at the outputs of said apparatus a plurality of separate output streams corresponding to separate grades of said fruit that are suitable to be packed and sold as fresh fruit;

selecting chemical coating treatments to applied to respectively corresponding ones of said plurality of output streams of fruit that are to be packed and sold as fresh fruit; and then concurrently applying said chemical coating treatments to the respectively corresponding ones of said plurality output streams of fruit.

11. The method of claim 10 wherein each of said separate streams of chemically treated fruit is then passed through sizing apparatus so as to divide each said separate stream into further streams according to size.

12. The method of claim 10 wherein said chemical treatment applied to each of said separate streams of fruit that is suitable to be packed and sold as fresh fruit is applied in two separate steps, a first step providing a coating of both wax and fungicide and a second step providing a coating of wax alone.

13. The method of claim 12 wherein each of said separate streams of chemically coated fruit is then passed through sizing apparatus so as to divide each said separate stream into further streams according to size.

* * * * *